P. HUFELAND.
BOOK HOLDER.
APPLICATION FILED FEB. 28, 1906. RENEWED AUG. 14, 1908.
907,239.
Patented Dec. 22, 1908.
3 SHEETS—SHEET 1.
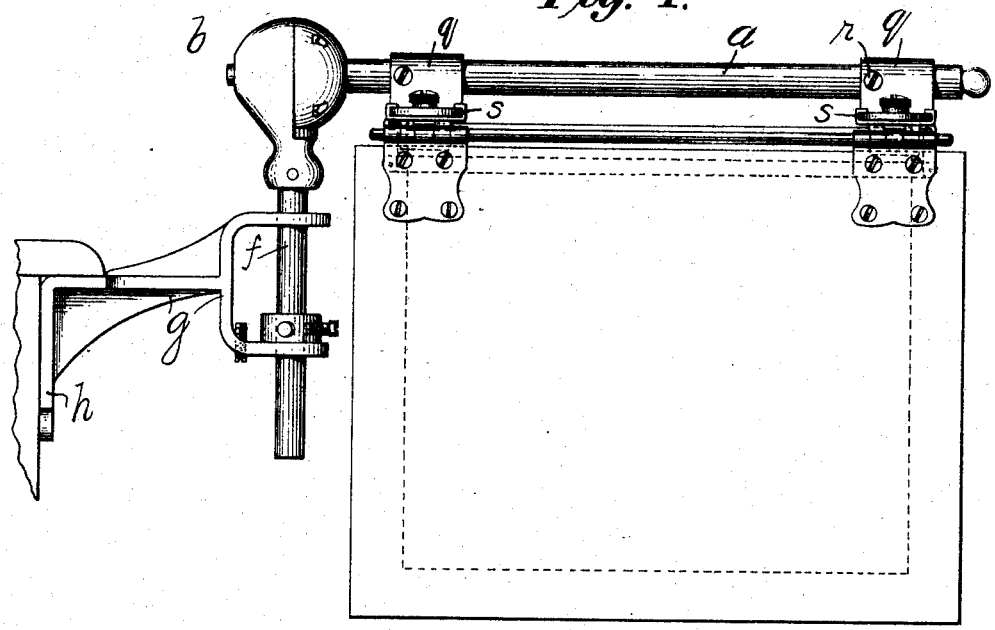
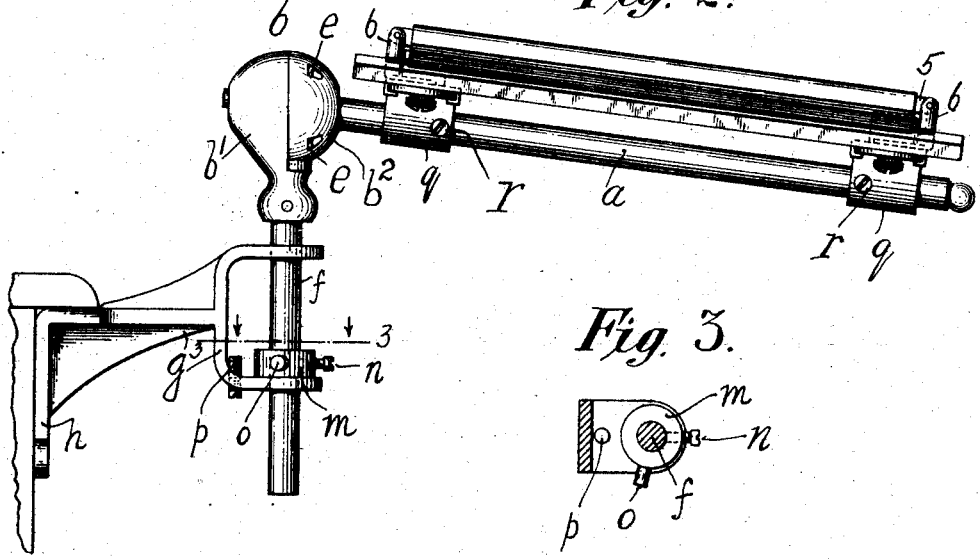
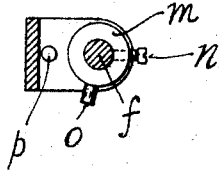
Attest:
Inventor:
P. Hufeland,
by R. W. Barkley, his Atty.

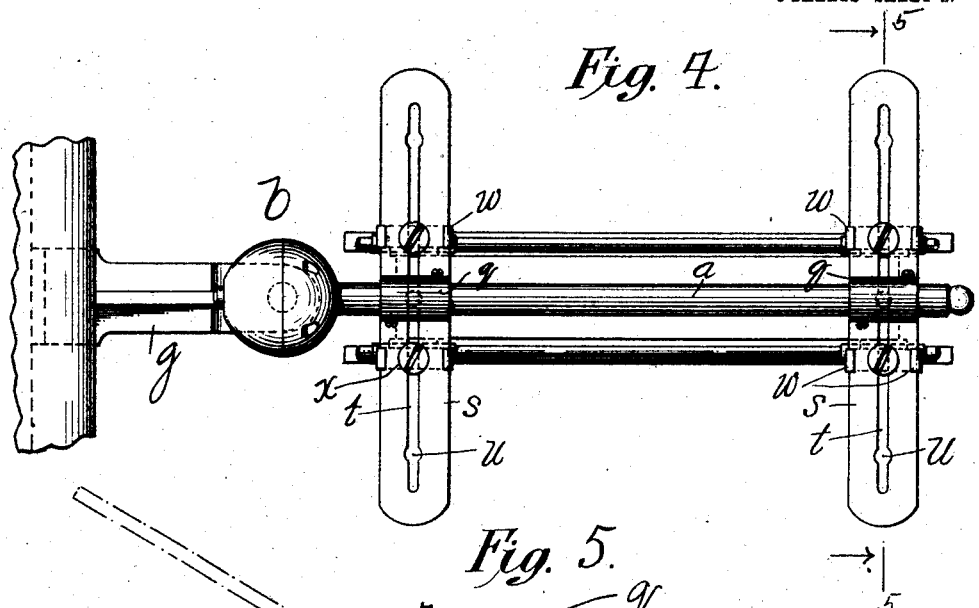
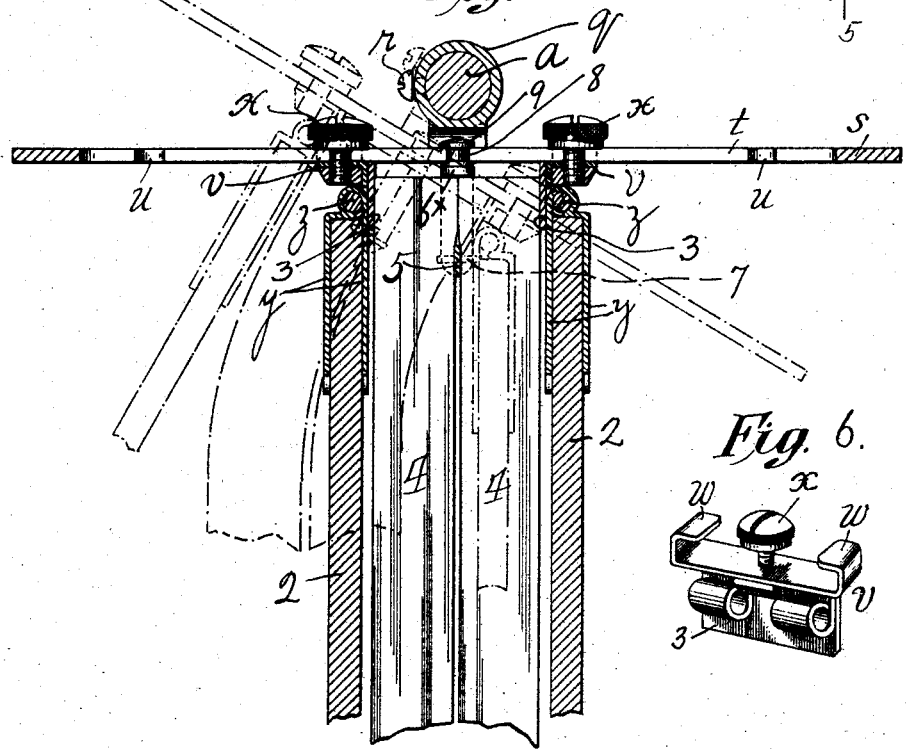
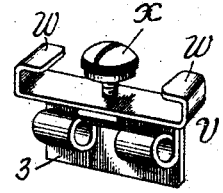

P. HUFELAND.
BOOK HOLDER.
APPLICATION FILED FEB. 28, 1906. RENEWED AUG. 14, 1908.

907,239.

Patented Dec. 22, 1908.
3 SHEETS—SHEET 3.

Attest:
Edgeworth Greene
Orson A. Rayner

Inventor:
P. Hufeland
by R. W. Barkley, his Atty.

UNITED STATES PATENT OFFICE.

PHILIP HUFELAND, OF NEW YORK, N. Y., ASSIGNOR TO SOLOMON R. HALLEY, OF NEW YORK, N. Y.

BOOK-HOLDER.

No. 907,239.      Specification of Letters Patent.      Patented Dec. 22, 1908.

Application filed February 28, 1906, Serial No. 303,382. Renewed August 14, 1908. Serial No. 448,613.

*To all whom it may concern:*

Be it known that I, PHILIP HUFELAND, a citizen of the United States, and a resident of New York city, in the county of New York and State of New York, have invented a certain new and useful Improvement in Book-Holders, of which the following is a specification.

This invention relates to book-holders, and has for one object the provision of simple, strong, and efficient means for detachably connecting books, magazines, catalogues, and the like to the supporting means.

Another object is to connect and disconnect the books, etc., to and from the holder without removing the shelves or either of them.

Another object is to allow the holder to tilt downward at its free extremity when it is in position for use.

Another object is to relieve the shelves of the side pressure of the books, etc.

Other objects will appear hereinafter.

The invention consists of features of construction, and combinations of devices hereinafter described, and more particularly pointed out in the appended claims.

The invention is embodied in the apparatus illustrated in the accompanying drawings, forming part hereof, in which—

Figure 7:
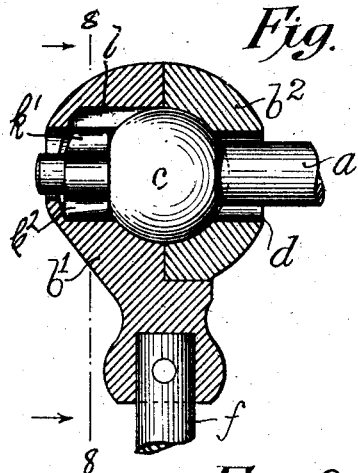
Figure 9:
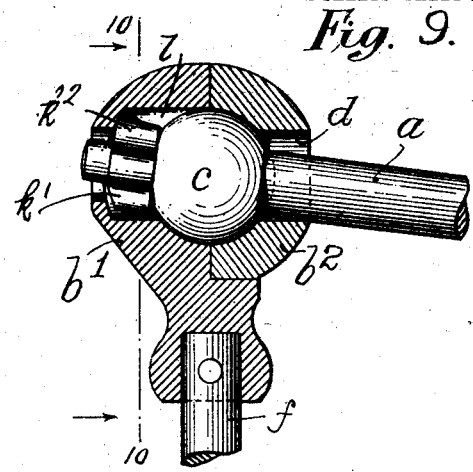
Figure 8:
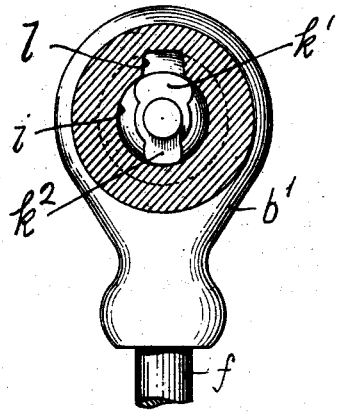
Figure 10:
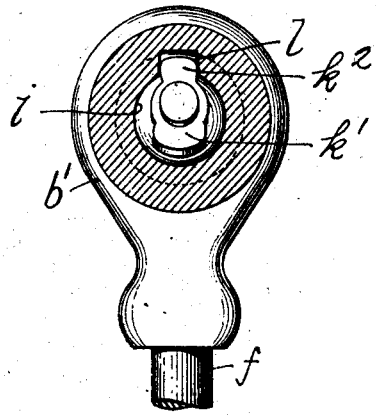
Figure 11:
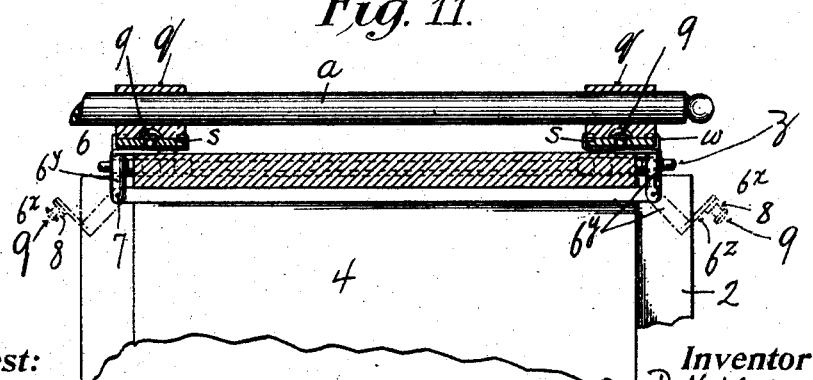

Figure 1 is a side elevation, with the parts in normal position; Fig. 2 is a like view, but with the book turned over and open; Fig. 3 is a plan view, on the line 3—3 of Fig. 2; Fig. 4 is a plan view, with parts omitted or broken away; Fig. 5 is a vertical sectional view on the plane 5—5 of Fig. 4; Fig. 6 is a perspective view of a hinge and clamp member; Fig. 7 is a vertical sectional view of the head; Fig. 8 is a view on line 8—8 of Fig. 7; Fig. 9 is a vertical sectional view of the head; Fig. 10 is a view on the plane 10—10 of Fig. 9; Fig. 11 is a vertical sectional longitudinal view, with parts broken away or omitted.

In the drawings, the reference character $a$ designates a rod which is preferably round where exposed, and $b$ denotes a head in which said rod is swiveled by means of a ball $c$, fast on the rod, and the opening $d$ in the head. The head $b$ is made in two parts, $b^1$ and $b^2$, which are united by screws $e$. The part $b^1$ is pinned to a vertical shaft $f$, which shaft is mounted in bearings in the bracket $g$, which may be secured to a vertical surface, or to a horizontal surface, according as it is provided with a flange $h$ which is parallel to or at right angles to, the shaft $f$.

The half-head $b^1$ is socketed at $i$ internally to receive and allow play to the end of shaft $a$, which is preferably reduced and which projects from the ball $c$, and said shaft-end has a double arm, $k^1$ and $k^2$, fastened thereon. The ends of the said arms, $k^1$ and $k^2$, are curved to fit the inner surface of the said socket $i$. (See Fig. 8.) At the top of the socket $i$ is a cross-groove $l$, of a width such that the wide arm $k^1$ cannot enter it, while the narrow arm $k^2$ may enter it. (See Figs. 8 and 10, respectively.) The half-heads $b^1$ $b^2$ are cut away to allow the rod $a$ to tilt whenever the arm $k^2$ enters the groove $l$, as shown in Fig. 9.

The shaft $f$ has a collar $m$ adjustably connected thereto by a set screw $n$, and the collar has a stop-arm $o$ thereon for coaction with a stop $p$ on the bracket $g$ to limit the swinging motion of the rod $a$. The stop arm $o$ may be adjustable in position on the shaft, if desired, to suit right and left hand swings for the rod $a$.

The rod $a$ has two sleeves $q$ adjustably connected thereto by set screws $r$, so that said sleeves may be adjustable along the rod to suit books of different lengths. The reference $s$ marks flat arms secured to the said sleeves $q$, said arms being slotted longitudinally at $t$. At $u$, the said slots $t$ are enlarged for a purpose presently to appear. The reference $v$ marks hinge-members provided with ears $w$ bent to embrace the edges of the said arms $s$, and $x$ marks clamping screws which pass through the said slots $t$ and engage with threaded holes in the members $v$, and which bind the said hinge-members $v$ to the arms $s$. Obviously, the said hinge-members $v$ may be adjusted along and be secured in any position on the arms $s$.

The reference $y$ marks hinge-members which are connected to the members $v$ by the rods $z$, and 2 marks shelves or covers which are held by the hinge-members $y$. The members $v$ are provided with presser-feet or guards 3 which are adapted to bear against the sides of the book or books, or other matter 4, to relieve the hinges proper of the outward pressure therefrom, thus causing the covers 2 to hang straight down when the parts are in normal position.

The book is held or retained in place by one or more blades or plates 5, which are pivotally connected at both ends, preferably, to carriers 6, the carrier-ends being split to receive the blades, and pins 7 being used to connect the blades and the carriers. The carriers 6 may be of any convenient shape or form, but it is preferred, in order to bring the arms $s$ over the ends of the books, to form the said carriers as shown, tow:t, with off-set ends, $6^x$ $6^y$, joined by transverse pieces $6^z$, and to have the end $6^x$ of a size to about fit the holes $u$ aforesaid, and to undercut the said part at 8 so that it may slide along the slots $t$, being held in place by the head 9 formed by said undercuts. This arrangement is preferred to that wherein the heads 9 engage with V-grooves in the opposte faces of the said slots $t$. Several retainers 5 may be used in book-holder, to hold one or more books, parts, or sections, therein, as a catalogue and supplements thereto.

Normally, the rod $a$ and the parts connected thereto lie as indicated in Figs. 1, 5, 7 and 8, but on turning the rod and connected parts over or through 180°, the parts assume positions similar to those indicated in Figs. 2, 9 and 10. In the normal positions of the parts, the book or books and the hinged shelves hang down, but in the positions indicated in Figs. 2, 9 and 10, the shelves lie out flat, and the books lie open for inspection or other use, being supported on the shelves. Obviously, if the arms $s$ are adjusted for books of different lengths and it is desired to have such arms protect the ends of the books in the manner above suggested, retainers 5 of proper lengths must be used.

It is noted that the described holder permits the covers to lie horizontal, thereby forming a desk, as it were, to write on. The books can be wire-bound, made in sections instead of in one large volume bound with linen thread. The shelves being stiff and a part of the permanent thing, books with soft covers may be inserted and removed, and be protected as well as if they had stiff covers. Samples of cloth, paper, &c., may be inserted in as many sections as desired. Any book-part, where the book is made in separate parts, may be inserted and removed without disturbing others, except, possibly, to remove them temporarly, and in all cases, the shelves are not removed, but are slid out beyond the holes $u$, so that the headed retainers may be removed.

What I claim as new and desire to secure by Letters Patent of the United States is—

1. In a book-holder, the combination of a bracket, a rod, a swivel connection between the bracket and the rod, and transverse arms on said rod provided with slots, with headed carriers engaging with said slotted arms, and a book-retaining bar hinged to said carriers.

2. In a book-holder, the combination of a bracket, a rod, a swivel connection between said bracket and said rod, and transverse arms on said rod provided with longitudinal slots having enlarged head-passing openings therein, with headed carriers engaging with said slotted arms, a book-retaining bar hinged to said carriers, and hinge-members for shelves also engaging with said slotted arms and movable beyond said openings, whereby said book-retainers may be removed and inserted without having to remove the shelf or shelves.

3. In a book-holder, transverse longitudinally slotted arms, hinge-members adjustably connected thereto, inside guards or presser-feet on said hinge-members, and means for detachably connecting books with said arms.

4. In a book-holder provided with shelves hinged thereto and with means for detachably connecting books thereto, guards or presser-feet inside the hinge-connections for the shelves to take the sidewise thrust of the book at the back thereof.

5. In a book-holder, transverse slotted arms, off-set carriers having heads engaging with said slotted arms, and a book-retaining bar hinged to said carriers.

6. In a book-holder, a round bar one end of which is flattened, a ball on said bar adjacent to said flattened end, and a shell for holding said ball and provided with a key-hole opening for said flattened end and with an opening for the round bar, in combination with means for connecting books and hinging shelves to said round bar.

7. The combination, in a book-holder, of a rod, a ball thereon and beyond which the rod projects in each direction, a double arm fast on one end of the rod, the said arms being of unequal widths and having rounded ends, and a head for receiving said ball and rod and socketed to receive said arms and provided with a narrow groove to receive the narrower arm, whereby said rod may tilt in a certain position thereof.

8. The combination of a flat arm slotted longitudinally, the slot having enlargements toward each end thereof, hinge-members, clamp screws connecting said members with said slotted arm, and a headed retainer for books engaging with said slotted arm, whereby the retainer may be inserted and removed without removing the hinge-member from the arm.

Signed at New York city in the county of New York and State of New York this 27th day of February, A. D. 1906.

PHIL. HUFELAND.

Witnesses:
   WILLIAM C. DORNIN,
   RICHARD W. BARKLEY.